(12) United States Patent
Strong

(10) Patent No.: US 7,628,439 B1
(45) Date of Patent: Dec. 8, 2009

(54) TRUCK TAILGATE EXTENSION AND TABLE

(76) Inventor: Larry R. Strong, 5917 Ever View Ct., Las Vegas, NV (US) 89148

( * ) Notice: Subject to any disclaimer, the term of this patent is extended or adjusted under 35 U.S.C. 154(b) by 22 days.

(21) Appl. No.: 12/114,080

(22) Filed: May 2, 2008

(51) Int. Cl.
*B62D 33/03* (2006.01)

(52) U.S. Cl. ............... 296/26.03; 296/26.09; 296/57.1; 108/44

(58) Field of Classification Search .............. 296/26.03, 296/26.09, 26.1, 26.08, 61, 57.1; 208/44, 208/69, 83, 89
See application file for complete search history.

(56) References Cited

U.S. PATENT DOCUMENTS

| | | | | |
|---|---|---|---|---|
| 3,010,760 | A * | 11/1961 | Trautmann | 296/57.1 |
| 5,312,149 | A * | 5/1994 | Boone | 296/61 |
| 5,823,595 | A * | 10/1998 | Tronco | 296/26.03 |
| 6,045,172 | A * | 4/2000 | Thomas et al. | 296/26.1 |
| 6,161,486 | A * | 12/2000 | Boots | 108/48 |
| 6,193,294 | B1 * | 2/2001 | Disner et al. | 296/26.11 |
| 6,367,858 | B1 * | 4/2002 | Bradford | 296/26.09 |
| 7,261,357 | B1 * | 8/2007 | Bechen | 296/62 |

* cited by examiner

*Primary Examiner*—Dennis H Pedder

(57) ABSTRACT

A truck tailgate extension is constructed of a truck tailgate that has a first cavity therein and pivotally engaging a truck bed; a first extension that has a second cavity therein slidingly engaging the first in a transverse direction of the tailgate and concealable by the truck tailgate when retracted; at least one second extension slidingly engaging the second cavity in a longitudinal direction of the tailgate and concealable by the first extension when retracted into the second cavity; a pair of support legs pivotingly engaging a bottom surface of the at least one second extension and stows into a corresponding pair of recessed slots in the bottom surface; and a third extension hingedly connected to a rear edge of the first extension such that the third extension pivotingly engaging an interior surface of the truck tailgate when in a stowed away position.

5 Claims, 4 Drawing Sheets

TRUCK TAILGATE EXTENSION AND TABLE

FIELD OF THE INVENTION

The present invention generally relates to a truck accessory and more particularly, relates to a truck tailgate extension and table.

BACKGROUND OF THE INVENTION

Pickup trucks with an open bed is one of the most popular motor vehicles for its passenger and cargo carrying capabilities. While pickup trucks can be selected with different sized cargo areas, there is always time that a cargo piece of extra length must be carried which may be too long for the truck even with the tailgate in a down position. Pickup trucks have also been widely used as transportation to sporting events and for tailgate parties that the driver may attend at the event. For the tailgate party, it may be desirable to have more tabletop space than that could be provided by the tailgate itself. It is therefore desirable to provide a tailgate that not only can be extended for carrying cargos, but also equipped with folding tables that can be unfolded for use at a picnic or tailgate party.

It is therefore an object of the present invention to provide a truck tailgate extension and folding table such that the usage of the truck can be greatly expanded.

SUMMARY OF THE INVENTION

In accordance with the present invention, a truck tailgate equipped with an extension and folding tables is provided.

In a preferred embodiment, the present invention truck tailgate extension system is constructed of a truck tailgate that has a first cavity therein and pivotally engaging a truck bed; a first extension that has a second cavity therein slidingly engaging the first in a transverse direction of the tailgate and concealable by the truck tailgate when retracted; at least one second extension slidingly engaging the second cavity in a longitudinal direction of the tailgate and concealable by the first extension when retracted into the second cavity; a pair of support legs pivotingly engaging a bottom surface of the at least one second extension and stows into a corresponding pair of recessed slots in the bottom surface; and a third extension hingedly connected to a rear edge of the first extension such that the third extension pivotingly engaging an interior surface of the truck tailgate when in a stowed away position.

BRIEF DESCRIPTION OF THE DRAWINGS

The invention will now be described, by way of example, with reference to the accompanying drawings, in which.

DETAILED DESCRIPTION OF THE PREFERRED EMBODIMENT

Figure 1:
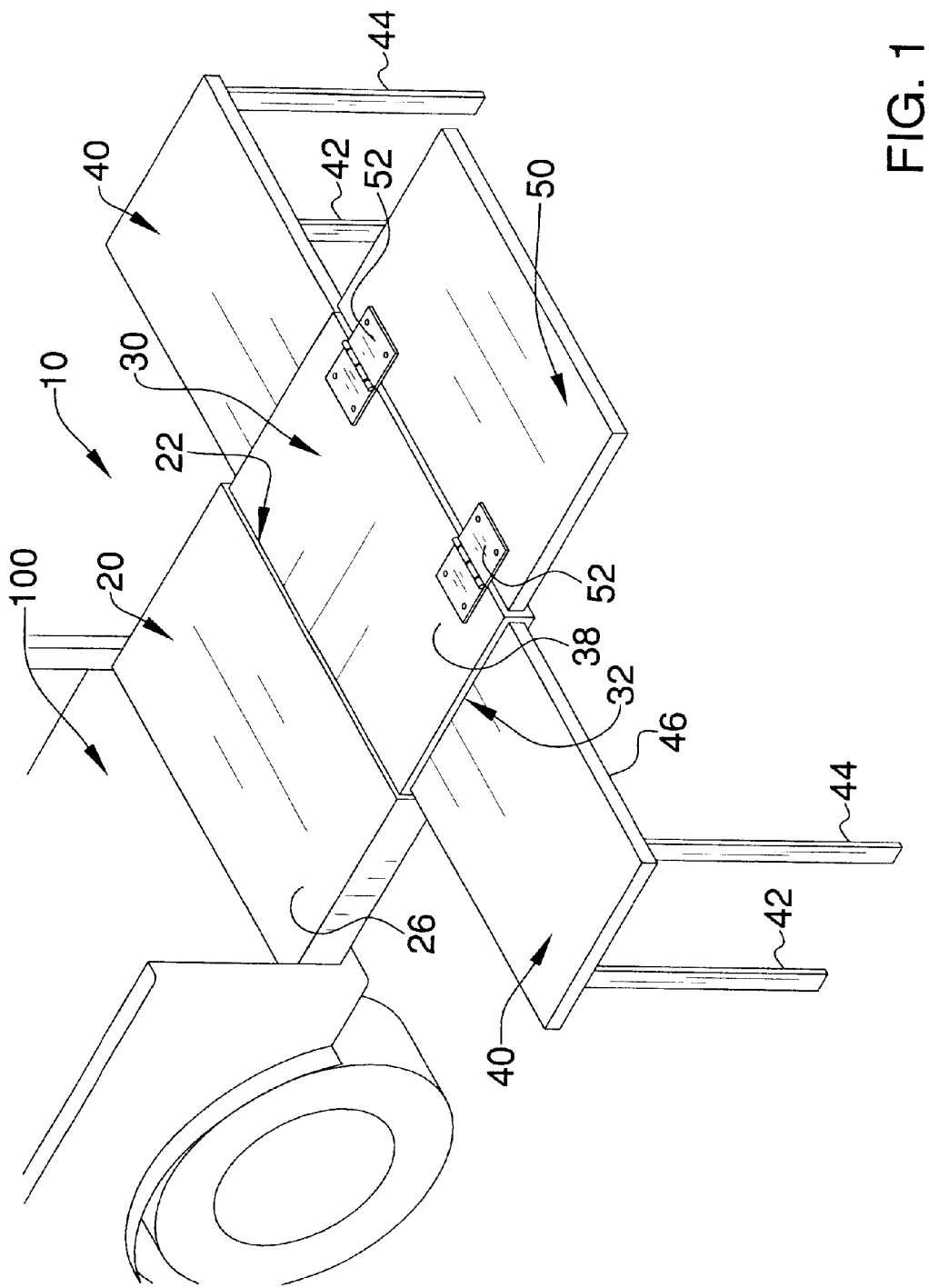
FIG. 1 is a perspective view of the present invention tailgate with the extension in an extended position and the folding tables in unfolded position.

The present invention discloses a truck tailgate extension and folding tables from the extension.

The present invention truck tailgate is a newly designed tailgate for pickup truck. It features a number of extension panels that can be extracted or unfolded to increase the length of a pickup trucks bed. Increased cargo capacity allows the truck owner to carry more or larger items and the tailgate provides enhanced convenience during a variety of recreational activities.

The present invention truck tailgate extension and table can be produced in a modified design compared to a conventional pickup truck tailgate. The tailgate can be modified to include two flat, slim, panel-like extensions, each measuring approximately the same length and width as the tailgate itself. These extensions can be realized as sliding panels that can be pulled from the interior of the tailgate once it was lowered as folding panels that can be extended once the tailgate was lowered. If the panels features sliding designs they can be mounted on sliding rails and can be extracted from the tailgate along with the panels themselves. If the panels are offered as folding components, they can be secured to one another and the tailgate with stiff, locking hinges. In either case, the two panels can effectively extends the tailgate several feet beyond the rear of the vehicle after they are extracted or unfolded from the tailgate. The first panel can also be offered with folding or pull-out side extensions. Each extension features a square shape and can likely include a fold-out leg on its underside for support. These side panels can be used as work surfaces or as tables during various recreational activities. The present invention can be offered in a variety of sizes, lengths, as well as in a range of attractive colors. It can potentially be offered as an OEM feature on newly manufactured pickup trucks. To use the present invention extension table a pickup truck owner first removes his vehicle's original tailgate and replaces it with the newly designed lift gate. In the event he needed to haul larger cargo or extra cargo he could simply lower the tailgate and either unfold or pull the two extension panels from its inner surface or interior. Once the panels were secured in horizontal positions, they can effectively extend the length of the truck's cargo bed by several feet. This allows the motorist to haul larger items or more items in the truck's cargo bed in a safe, secure and convenient manner. When the truck is parked, the user can extend the side panels to provide additional work surfaces or tables for use during various recreational activities.

The present invention truck tailgate extension and table fulfills the need for increased cargo capacity and provide additional table space for pickup trucks. The appealing features of the present invention are its convenience, ease of use, enhanced safety effective and versatile design, ability to extend the cargo bed of a pickup truck. The fold-out or pull-out panels of this new tailgate allows a pickup truck owner to quickly and easily extend the length of his truck's cargo area. This ensures oversized cargo, such as limber planks, carpets, furniture and others such items can rest securely within the cargo bed without hanging over the end of a lowered tailgate. It also eliminates the need for a vehicle owner to stack cargo within his trucks' bed. This eliminates the risk of the cargo falling or shifting about and becoming damaged or possibly flying from the truck during transport. It prevents the cargo from being damaged or destroyed and thus can spare an individual the cost and hassles associated with repairing or replacing cargo items. It also ensures loose cargo does not become a roadway hazard and this prevents accidents, injuries, and fatalities. The present invention can help maintain and eliminate the need for a truck owner to purchase a utility trailer. This saves money and eliminates the need to find room for storing the trailer. The feature is a fold-out side extension on its first panel, which can be used to provide additional workspace. It can enhance convenience among construction workers and various tabletop surfaces that can be used during a variety of recreational activities, such as tailgating, camping, or picnicking. The present invention can be installed in a quick and easy manner by a capable DIY automotive enthusiast or by a professional auto body technician. It can also be produced from durable materials that can withstand years of heavy-duty use and expose to elements. It also can be offered on newly manufactured pickup trucks. Such an accessory can provide truck makers with a convenient new feature that can enhance the marketability of their vehicles. The easy to use, convenient, practical, space-savings, versatile, safety-enhancing and durable for years of effective, low-maintenance use.

Referring initially to FIG. 1, wherein a perspective view of the present invention truck tailgate extension and table 10 is shown in a fully extended position. The truck tailgate extension and table 10 is constructed of a truck tailgate 20 that has a first cavity 22 therein and the tailgate 20 pivotally engaging a truck bed 100. A first extension 30 that has a second cavity 32 therein slidingly engaging the first cavity 22 in a transverse direction of the tailgate 20, and concealable by the truck tailgate 20 when fully retracted. At least one second extension 40, two such extensions are shown in FIG. 1, slidingly engaging the second cavity 32 in a longitudinal direction of the tailgate 20 and is concealable by the first extension 30 when fully retracted into the second cavity 32.

Figure 2:
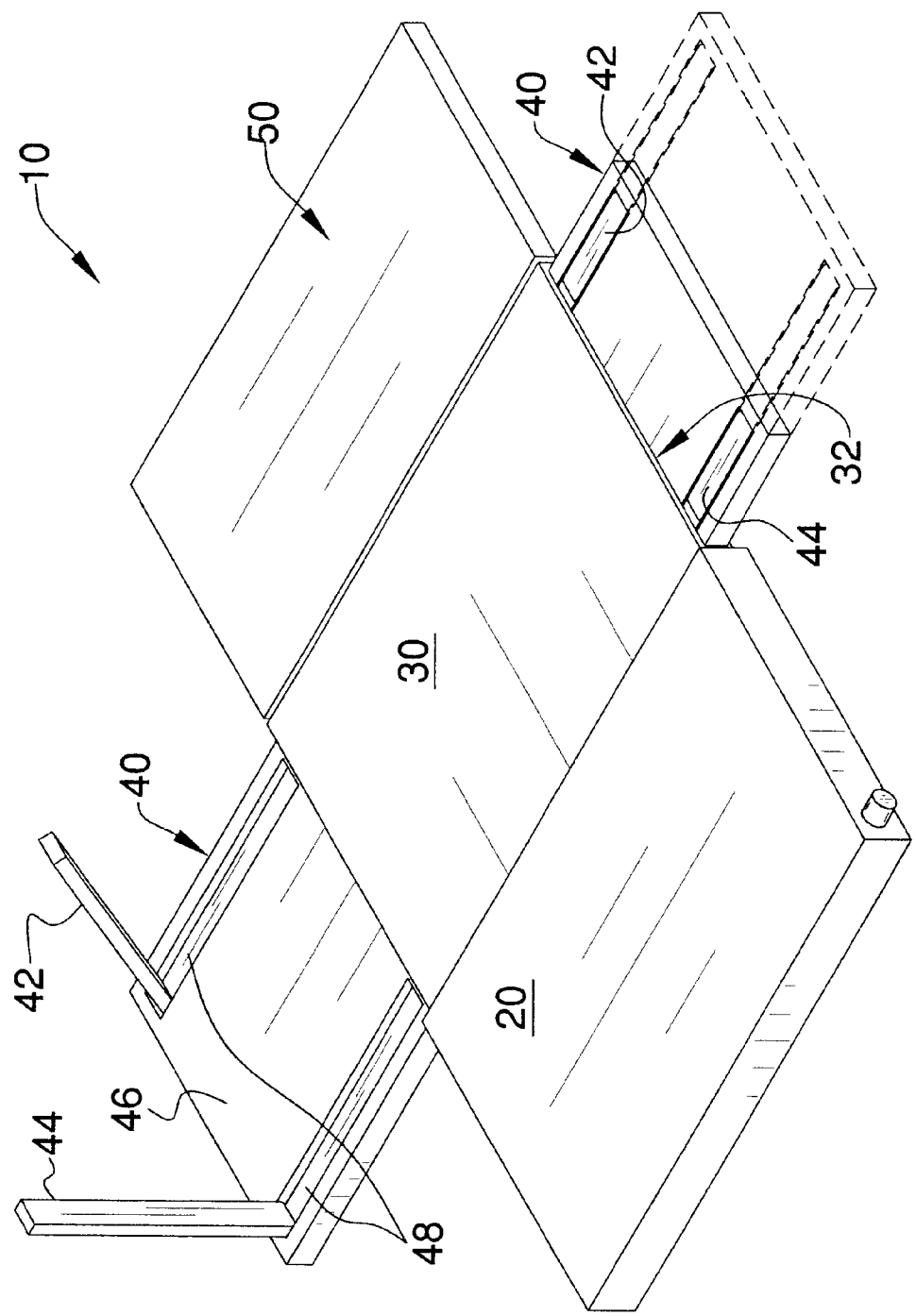
FIG. 2 is a perspective view illustrating the bottom side of the present invention shown in FIG. 1.

A pair of support legs 42, 44 pivotally engaging a bottom surface 46 (shown in FIG. 2) of the at least one second extension 40 and stows into a corresponding pair of recessed slots 48, shown in FIG. 2, in the bottom surface 46.

The present invention truck tailgate extension and table 10 further include a third extension 50 that is hingedly connected to a rear edge 38 of the first extension 30 such that the third extension 50 pivotally engaging an interior surface 26 of the truck tailgate 20 when in a stowed-away position.

A pair of hinges 52 are utilized for such purpose.

Figure 3:
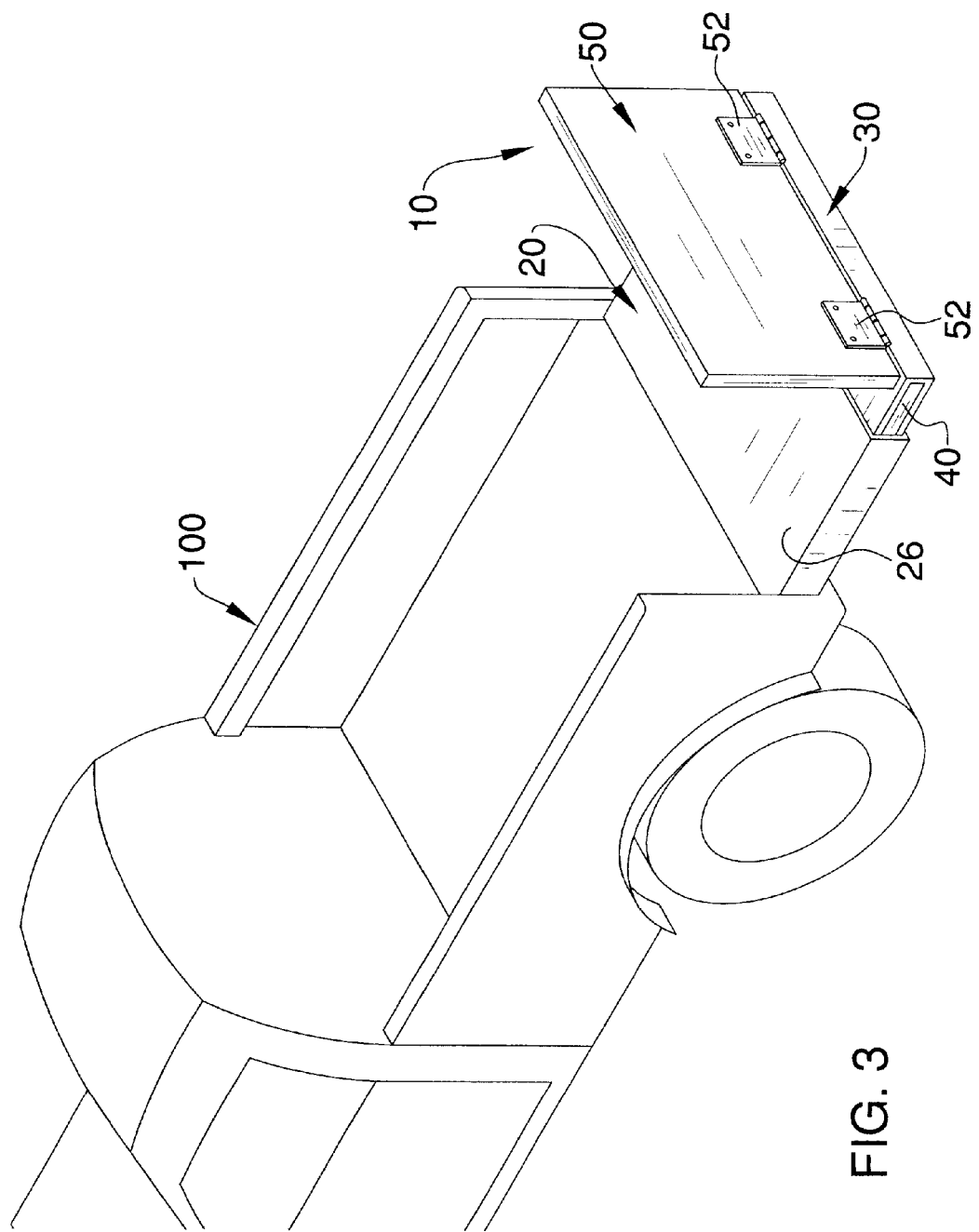
FIG. 3 is a perspective view of the present invention truck tailgate with the extension in a half retracted position.
Figure 4:
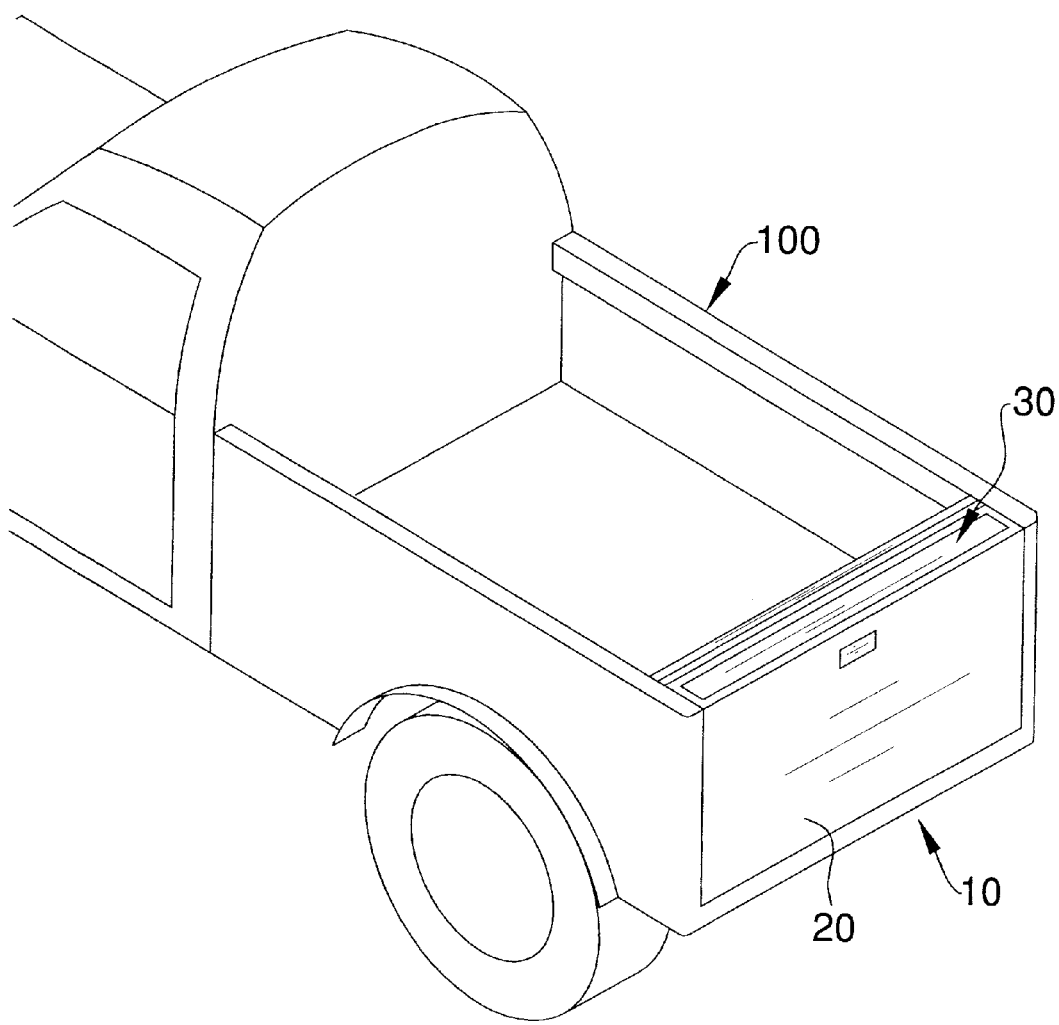
FIG. 4 is a perspective view of the present invention with the tailgate in a completely closed position.

FIG. 3 illustrates a perspective view of the present invention truck tailgate extension and table 10 in a partially retracted position, while FIG. 4 shows a perspective view of the present invention truck tailgate extension and table 10 in a fully retracted and closed position of the tailgate 20.

The present invention truck tailgate extension 30, 50, and 40 may be advantageously made of metal or a rigid plastic. The pair of support legs 42,44 may also be made of similar materials.

The present invention truck tailgate extension and table has therefore been amply described in the above descriptions and in the appended drawings of FIGS. 1-4.

While the preferred embodiments of the invention have been described above, it will be recognized and understood that various modifications can be made in the invention and the appended claims are intended to cover all such modifications which may fall within the spirit and scope of the invention.

What is claimed is:

1. A truck tailgate extension comprising:
a truck tailgate having a first cavity therein and pivotally engaging a truck bed;
a first extension having a second cavity therein slidingly engaging said first cavity in a transverse direction of said tailgate and concealable by said truck tailgate when retracted;
at least one second extension slidingly engaging said second cavity in a longitudinal direction of said tailgate and concealable by said first extension when retracted into said second cavity;
a pair of support legs pivotingly engaging a bottom surface of said at least one second extension and stows into a corresponding pair of recessed slots in said bottom surface; and
a third extension hingedly connected to a rear edge of said first extension such that said third extension pivotingly engaging an interior surface of said truck tailgate when in a stowed away position.

2. The truck tailgate extension according to claim 1, wherein said at least one second extension is two extensions each emanating from an opposite end of said second cavity in said first extension.

3. The truck tailgate extension according to claim 1, wherein said tailgate, first extension, second extension and third extension are fabricated in metal.

4. The truck tailgate extension according to claim 1, wherein said first extension, second extension and third extension are fabricated in a rigid plastic.

5. The truck tailgate extension according to claim 1, wherein said pair of support legs is fabricated in a rigid plastic.

* * * * *